(12) United States Patent  (10) Patent No.: US 7,722,495 B1
Stanley  (45) Date of Patent: May 25, 2010

(54) AUTOMOTIVE DIFFERENTIAL LOCKING MECHANISM

(76) Inventor: Eric M. Stanley, 8254 Hannah Lake, Caledonia, MI (US) 49316

( * ) Notice: Subject to any disclaimer, the term of this patent is extended or adjusted under 35 U.S.C. 154(b) by 354 days.

(21) Appl. No.: 11/948,416

(22) Filed: Nov. 30, 2007

(51) Int. Cl.
  *F16H 48/06* (2006.01)
(52) U.S. Cl. ..................................... 475/220
(58) Field of Classification Search .............. None
  See application file for complete search history.

(56) References Cited

U.S. PATENT DOCUMENTS 4,379,413 A * 4/1983 Brammer et al. ........... 74/665 T
4,621,540 A * 11/1986 Davison ................... 74/665 T

OTHER PUBLICATIONS

Exploded assembly view of prior art General Motors Corporation automotive differential.

* cited by examiner

*Primary Examiner*—Dirk Wright
(74) *Attorney, Agent, or Firm*—Van Dyke, Gardner, Linn & Burkhart, LLP

(57) ABSTRACT

A differential carrier in accordance with the invention comprises a rotatable housing and permanent differential locking members installed within cavities of the housing. The locking members have locking holes with teeth that immovably link the locking members with the drive axle shafts. The locking members also include locking protrusions projecting from the locking members with the locking protrusions mechanically engaging the housing such that the locking members rotate simultaneously with rotation of the housing, whereby the locking members cause the axle shafts to rotate such that oppositely disposed wheels mounted on the axle shafts simultaneously and continuously rotate.

20 Claims, 11 Drawing Sheets

AUTOMOTIVE DIFFERENTIAL LOCKING MECHANISM

BACKGROUND OF THE INVENTION

The present invention is directed to a differential carrier for vehicles, and in particular to a differential carrier causing oppositely disposed wheels to simultaneously and continuously rotate.

Vehicle differential carriers or differentials are well known for use in vehicles to allow the driving wheels, such as the two front wheels in a front wheel drive vehicle or the two rear wheels in a rear wheel drive vehicle, to rotate at different speeds, but with the same torque being supplied to the driving wheels. The ability to apply power to the driving wheels at different speeds is desired because the wheels will necessarily rotate at different speeds when, for example, the vehicle is turning. In the case of turning, the wheel located on the inside of the corner travels a shorter distance as compared to the outer wheel.

Vehicles with a standard differential may encounter trouble when one of the driving wheels is located on a slippery surface, such as in mud or on ice, and the other wheel is on a surface providing sufficient traction. Rather than enable the wheel on the surface with traction to drive the vehicle, the wheel on the slippery surface will merely spin.

To overcome the above noted difficulty, differentials are known to be supplied with various components or structures to control or limit the rotational speed disparity between the driving wheels affixed to the differential. Such devices include limited slip differentials that contain a combination of clutch and friction plates for selectively distributing additional torque to the non-spinning wheel based on the rotational speed difference between the wheels. Still another device is a selectively locking differential, which may incorporate cam plates, flyweights, activating links, and friction plates. Such differentials selectively couple or "lock" the axles of the two driving wheels to the differential upon sensing that one wheel is rotating sufficiently in excess of the other, thereby enabling both wheels to rotate at the same rate. Upon the release of torque to the driving wheels, such as upon the release of the accelerator pedal by the vehicle's driver, the locking mechanism disengages to thereby again enable the axles to rotate at different speeds.

SUMMARY OF THE INVENTION

The present invention provides a differential carrier incorporating permanent differential locking members for converting a limited slip or selectively locking differential into a permanently locked differential carrier in which the oppositely disposed driving wheels simultaneously and continuously rotate.

According to an aspect of the present invention, a differential carrier for causing oppositely disposed wheels mounted on first and second axle shafts to simultaneously and continuously rotate comprises a rotatable differential carrier housing and first and second permanent differential locking members. The housing has first and second shaft openings adapted to receive the first and second axle shafts, respectively. The housing further includes a first housing cavity and a second housing cavity disposed internally of the housing adjacent the first and second shaft openings, respectively.

The first locking member has a first locking hole having first hole teeth that immovably link the first locking member with the first axle shaft. The first locking member also includes a first locking protrusion projecting from the first locking member. The first locking member is installed in the first housing cavity with the first locking protrusion mechanically engaging the housing such that the first locking member rotates simultaneously with rotation of the housing, whereby the first locking member causes the first axle shaft to rotate.

The second locking member has a second locking hole having second hole teeth that immovably link the second locking member with the second axle shaft. The second locking member also includes a second locking protrusion projecting from the second locking member. The second locking member is installed in the second housing cavity with the second locking protrusion mechanically engaging the housing such that the second locking member rotates simultaneously with rotation of the housing, whereby the second locking member causes the second axle shaft to rotate.

According to another aspect of the present invention, a differential carrier for causing oppositely disposed wheels mounted on first and second axle shafts to simultaneously and continuously rotate comprises a rotatable differential carrier housing, first and second side gears, and first and second permanent differential locking members. The housing has first and second shaft openings adapted to receive the first and second axle shafts, respectively, and further includes first and second housing cavities disposed internally of the housing adjacent the first and second shaft openings, respectively. The first housing cavity includes four first cavity indents, and the second housing cavity includes four second cavity indents.

The first side gear includes a first hub having external first hub teeth and internal first hub teeth, with the internal first hub teeth being adapted to receive the first axle. The second side gear includes a second hub having external second hub teeth and internal second hub teeth, with the internal second hub teeth being adapted to receive the second axle.

The first permanent differential locking member includes four radially projecting first member locking tabs and the second locking member includes four radially projecting second member locking tabs. The first locking member has a first locking hole having first hole teeth adapted to engage the external first hub teeth. The first member locking tabs are received in the first cavity indents when the first locking member is installed in the first housing cavity such that the first locking member mechanically engages the housing and rotates simultaneously with rotation of the housing, whereby the first locking member causes the first axle shaft to rotate.

The second locking member has a second locking hole having second hole teeth adapted to engage the external second hub teeth. The second member locking tabs are received in the second cavity indents when the second locking member is installed in the second housing cavity such that the second locking member mechanically engages the housing and rotates simultaneously with rotation of the housing, whereby the second locking member causes the second axle shaft to rotate.

A method of converting a standard differential to a fully locked differential comprises removing the components enabling the axles to rotate at different rotational speeds and/or the components enabling the axles to be selectively locked. The method further comprises installing first and second locking members into the housing and linking the first and second axle shafts to the differential housing whereby the first and second axle shafts are constrained to rotate with rotation of the housing.

The differential carrier by way of installation of permanent differential locking members causes both of the driving wheels to simultaneously and continuously rotate at an equivalent rate of rotation. In the illustrated embodiment two locking members are employed in an American Axle &

Manufacturing, Inc. differential that is used with, for example, pickup trucks and SUV's manufactured by the General Motors Corporation and commonly known by the General Motors option code "G80", wherein factory supplied components that selectively lock the driving wheels, as well as components enabling axle shafts to rotate at different rates are removed. The removed components of the illustrated embodiment include a pair of spider gears, a rotating flywheel shaft having a flywheel mounted thereto, a pawl shaft having a pawl mounted thereto, with the pawl being selectively acted on by the flywheel, a cam plate, a movable disk set biased by a wave spring, and first and second disk packs comprising friction and guide disks that are associated with first and second vehicle axles. Employment of the permanent locking members with the differential carrier enables the vehicle to which it is used to be particularly useful for off-road applications, such as off-road recreational and emergency vehicles, and pulling applications, such as pulling competitions, as the oppositely disposed driving wheels affixed to the differential will both be simultaneously and continuously driven with approximately equivalent torque.

These and other objects, advantages, purposes and features of this invention will become apparent upon review of the following specification in conjunction with the drawings.

DESCRIPTION OF THE PREFERRED EMBODIMENTS

Figure 1:
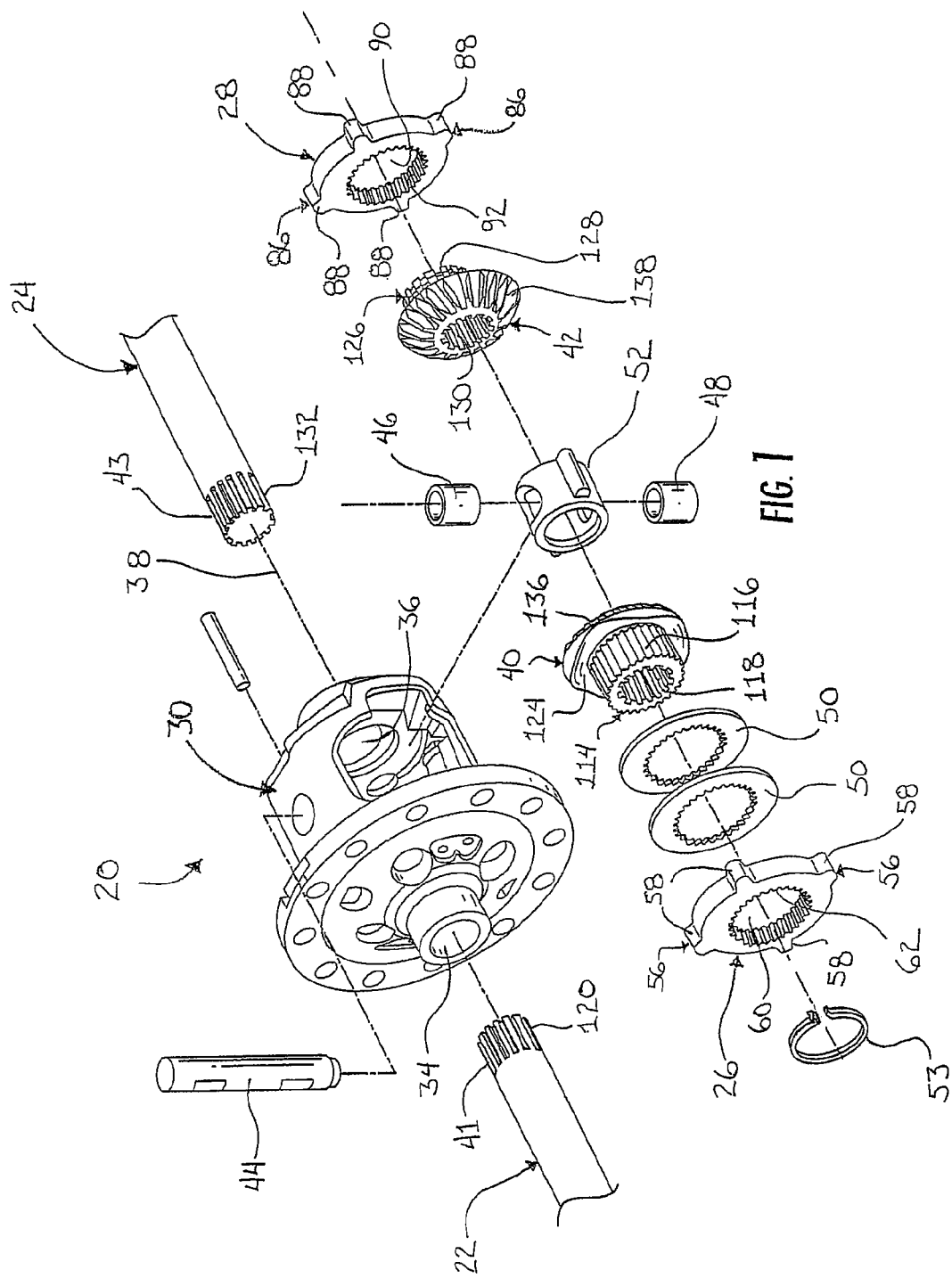
FIG. 1 is an exploded perspective view of a differential carrier in accordance with the present invention.
Figure 2:
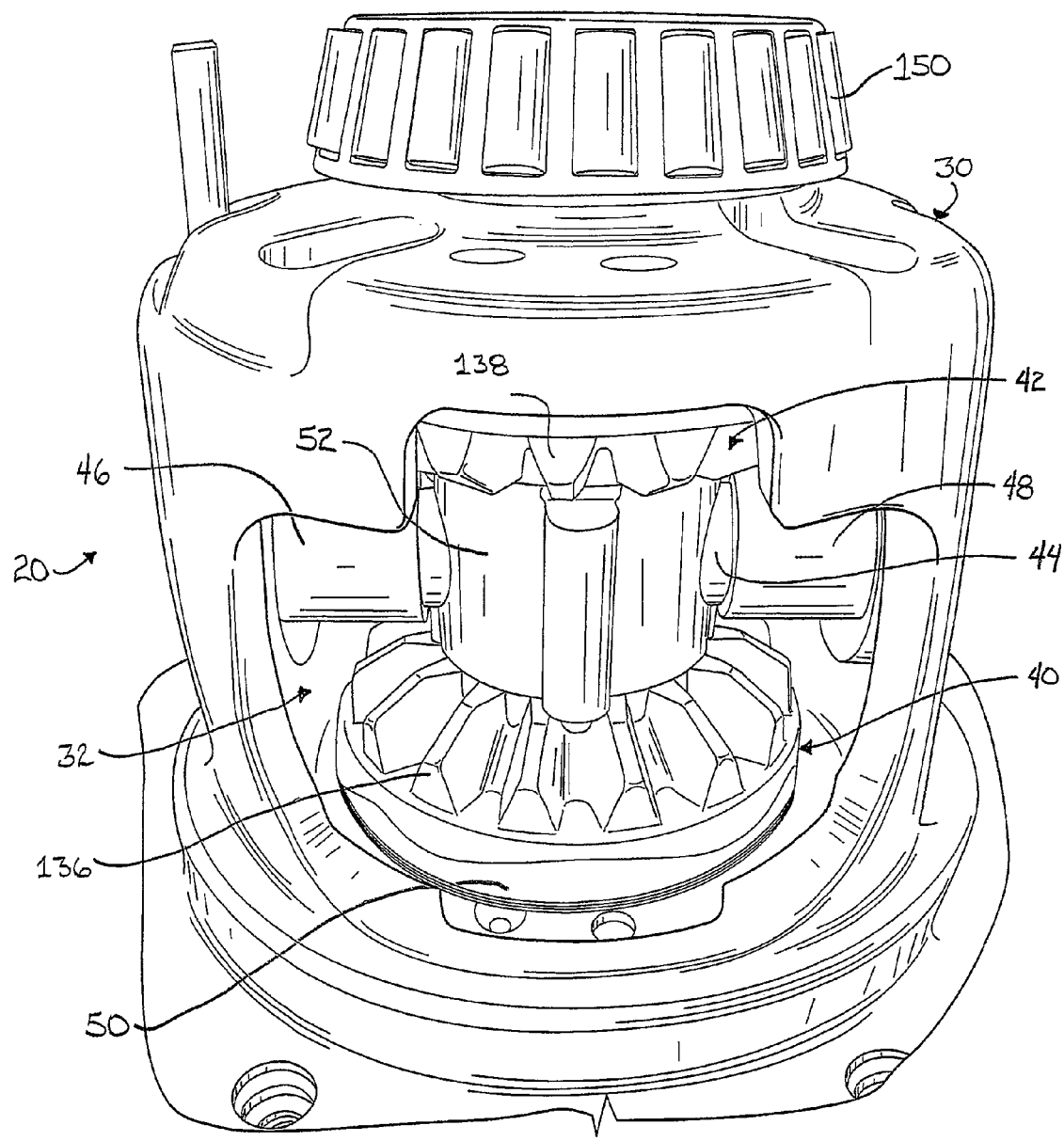
FIG. 2 is a partial perspective view of the differential carrier of FIG. 1 shown assembled.
Figure 3:
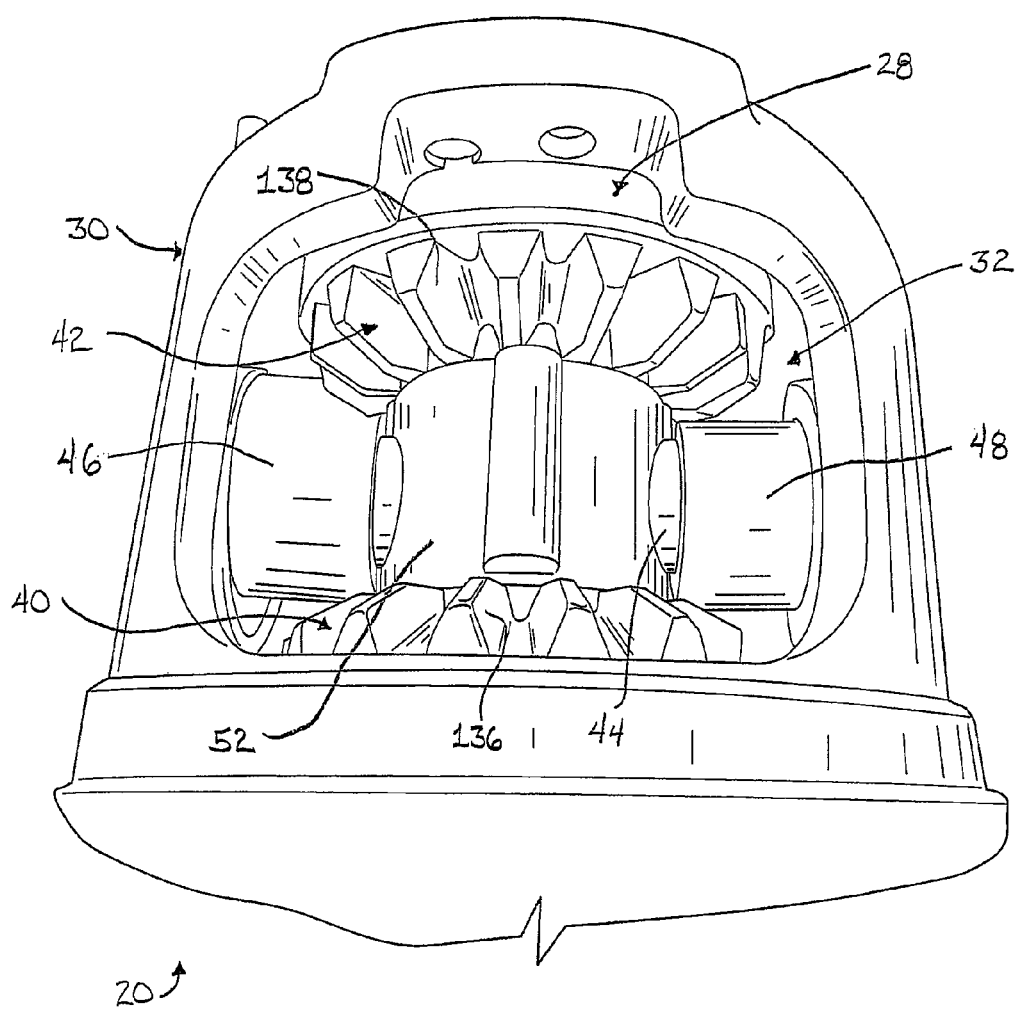
FIG. 3 is a partial perspective view of the differential carrier of FIG. 1 shown assembled and from a lower perspective from FIG. 2.

The present invention will now be described with reference to the accompanying figures, wherein the numbered elements in the following written description correspond to like-numbered elements in the figures. FIGS. 1-3 illustrate an embodiment of the present invention in which an American Axle & Manufacturing, Inc differential is converted to a permanently locked differential carrier 20. Differential carrier 20 is adapted to rotate a first axle shaft 22 and a second axle shaft 24 of a vehicle at the same rate of rotation continually and constantly independently of the sensing of a difference in wheel rotation between the first and second axle shafts 22, 24 such that the differential carrier 20 is continuously and fully locked. As described in more detail below, differential carrier 20 incorporates a first permanent differential locking member 26 and a second permanent differential locking member 28 causing differential carrier 20 to be continuously locked and enabling the first and second axle shafts 22, 24 to be driven by the differential carrier 20 at the same rate of rotation.

Figure 4:
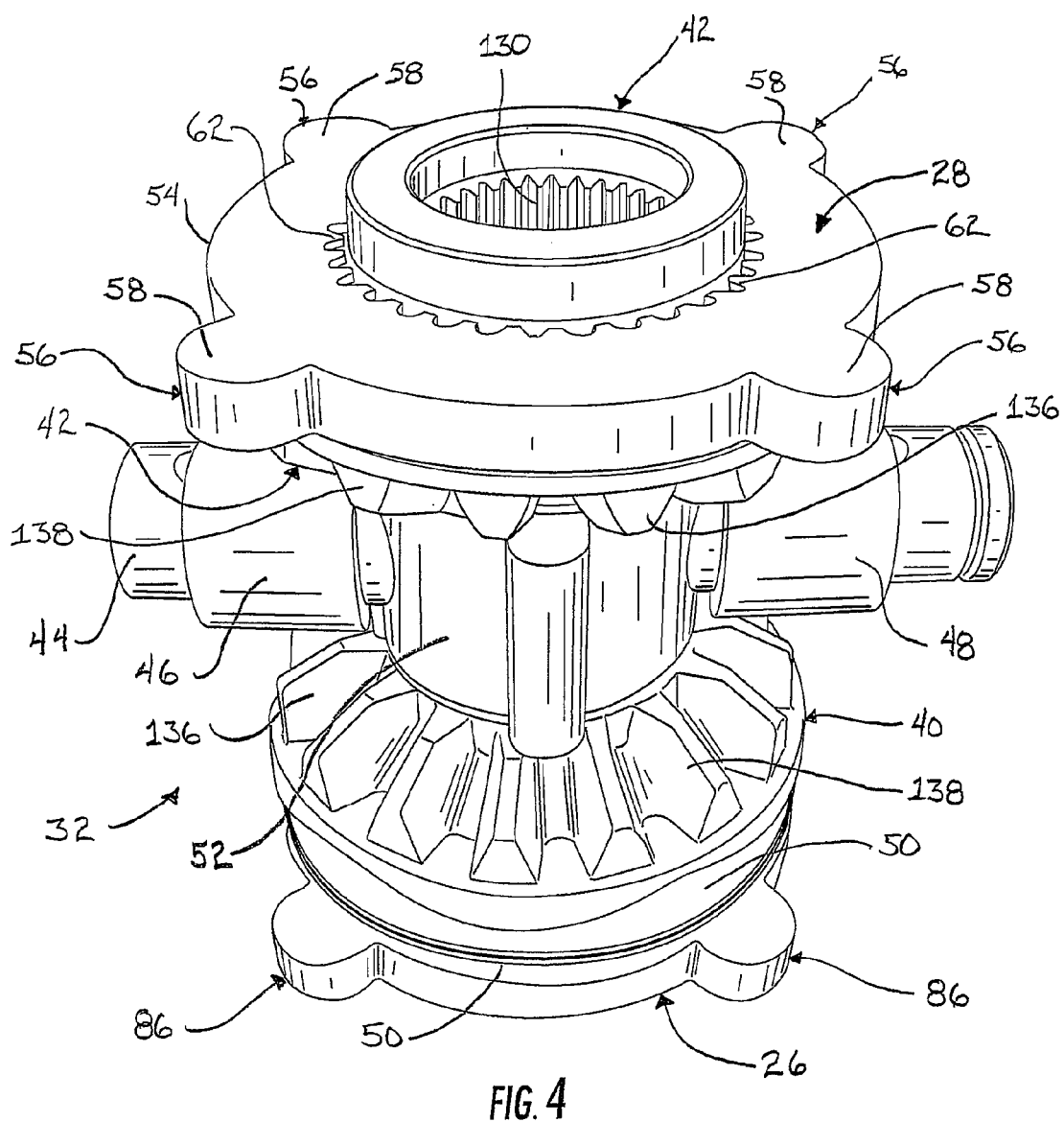
FIG. 4 is a perspective view of the internal assembly components of the differential carrier of FIG. 1 shown removed from the differential carrier housing.

Referring again to FIGS. 1-3, differential carrier 20 includes a differential carrier housing or housing 30 into which the differential components assembly 32 (FIG. 4) are installed. Housing 30 includes a first axle shaft opening 34 and a second axle shaft opening 36 into which first axle shaft 22 and second axle shaft 24 of the vehicle are installed, respectively. In operation, a ring gear (not shown) mounted to the differential housing 30 is driven by a pinion gear (not shown) that is in turn driven via the vehicle's drive shaft (not shown) extending from the vehicle's transmission (not shown) such that differential housing 30 is caused to rotate about axis 38. In turn, differential carrier 20 causes first and second vehicle axles 22, 24 to rotate, as described below, to thereby cause the vehicle to which differential carrier 20 is mounted to be propelled.

Differential carrier 20 further includes in addition to first and second permanent differential locking members 26, 28, a first side gear 40 and a second side gear 42. Also included are a cross shaft 44 to which are mounted shaft spacers 46, 48, and a pair of first side spacers 50 positioned between first side gear 40 and first locking member 26. A gear spacer 52 is also included, through which cross shaft 44 is installed. First side gear 40 is mounted to end 41 of first axle shaft 22 when first axle shaft 22 is installed into housing 30, and second side gear 42 is mounted to end 43 of second axle shaft 24 when second axle shaft 24 is installed into housing 30. As described below, first locking member 26 mounts to first side gear 40, with spacers 50 positioned there between and first locking member 26 retained on first side gear 40 by C-clip 53. First locking member 26 thereby locks first axle shaft 22 with differential housing 30. Similarly, second locking member 28 mounts to second side gear 42 and locks second axle shaft 24 with housing 30. First and second axle shafts 22, 24 are thereby constrained to rotate simultaneously with differential housing 30.

Figures 5, 5A:
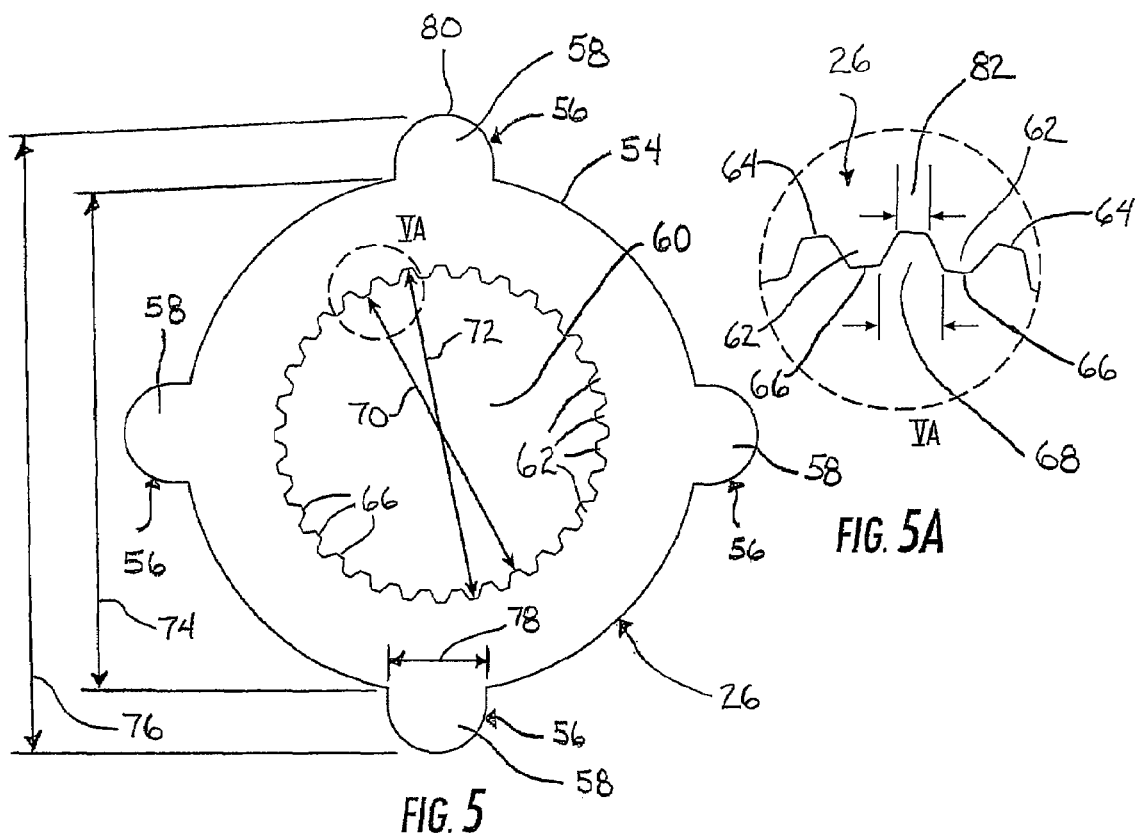
FIG. 5 is a top plan view of a first locking member of the differential carrier of FIG. 1.
FIG. 5A is a close up view of the first locking member of FIG. 5 showing the detail of the area identified by VA.

With further reference to FIGS. 5 and 5A, first locking member 26 is generally ring shaped having an outer surface 54 from which locking protrusions 56 project, with the locking protrusions 56 being disclosed as four radially projecting locking tabs 58 that are uniformly disposed approximately 90 degrees apart from adjacent locking tabs 58 about the first locking member 26. First locking member 26 includes a first locking hole 60 having hole teeth 62 disposed about the internal circumference of locking hole 60. The hole teeth 62 comprise multiple bottom lands 64 and top lands 66 defining teeth openings 68, with both a top land diameter 70 and a bottom land diameter 72 being defined across first locking hole 60.

In the illustrated embodiment, the ring shaped portion of first locking member 26 has an outside diameter 74 of 4.293 inches, and first locking member 26 has an overall dimension 76 of 5.288 inches across oppositely disposed locking tabs 58. Each locking tab 58 has a width 78 of 0.811 inches and the ends 80 of locking tabs 58 define a radius of 0.4055 inches. Bottom land diameter 72 is 2.778 inches and top land diameter 70 is 2.585 inches. Each bottom land 64 has a width 82 of 0.075 inches and teeth openings 68 are 0.175 inches. In the illustrated embodiment, first locking member 26 is 0.500 inches thick.

Figures 6, 6A:
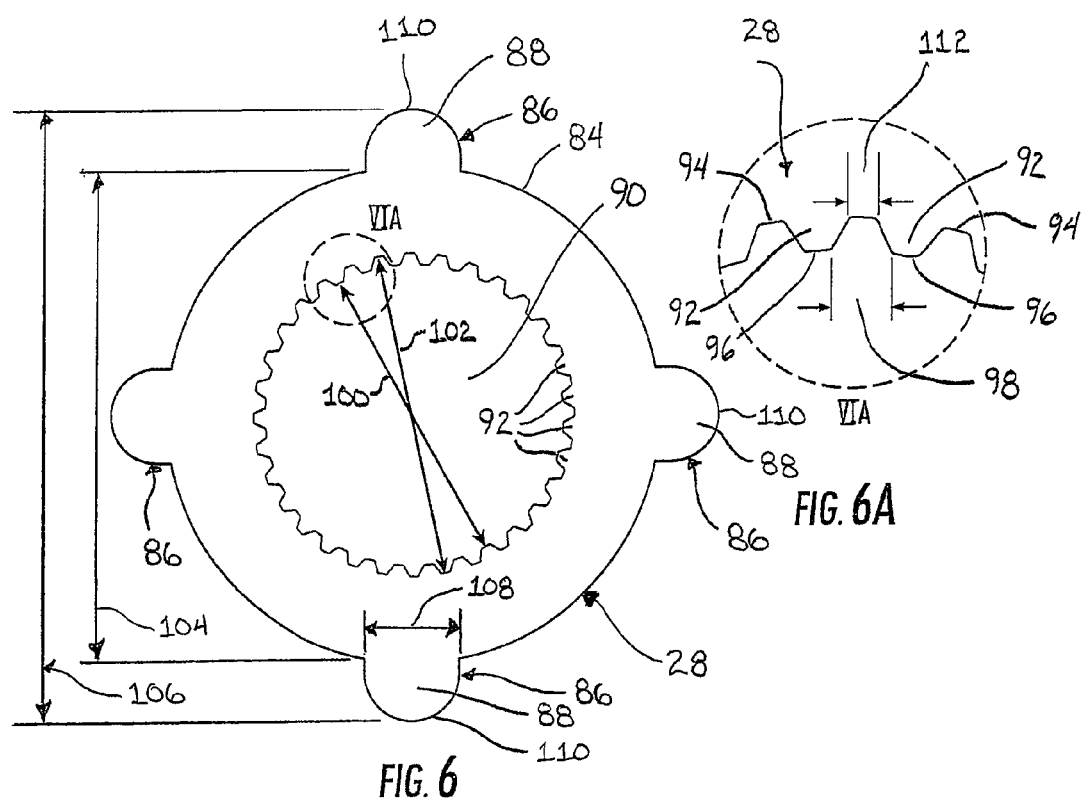
FIG. 6 is a top plan view of a second locking member of the differential carrier of FIG. 1.
FIG. 6A is a close up view of the second locking member of FIG. 6 showing the detail of the area identified by VIA.

With further reference to FIGS. 6 and 6A, second locking member 28 is of generally like construction to that of first locking member 26. Second locking member 28 is also generally ring shaped having an outer surface 84 from which locking protrusions 86 project, with the locking protrusions 86 being disclosed as four radially projecting locking tabs 88 that are uniformly disposed approximately 90 degrees apart from adjacent locking tabs 88 about the second locking member 28. Second locking member 28 includes a second locking hole 90 having hole teeth 92 disposed about the internal circumference of locking hole 90. The hole teeth 92 comprise multiple bottom lands 94 and top lands 96 defining teeth openings 98, with both a top land diameter 100 and a bottom land diameter 102 being defined across second locking hole 90.

In the illustrated embodiment, the ring shaped portion of second locking member 28 has an outside diameter 104 of 4.293 inches, and second locking member 28 has an overall dimension 106 of 5.288 inches across oppositely disposed locking tabs 88. Each locking tab 88 has a width 108 of 0.811 inches and the ends 110 of locking tabs 88 define a radius of 0.4055 inches. Bottom land diameter 102 is 2.757 inches and top land diameter 100 is 2.5641 inches. Each bottom land 94 has a width 112 of 0.055 inches and teeth openings 98 are 0.147 inches. In the illustrated embodiment, second locking member 28 is 0.455 inches thick.

First side gear 40 includes a hub 114 having external hub teeth 116 and internal hub teeth 118. Internal hub teeth 118 are adapted to spline to shaft teeth 120 on end 41 of first axle shaft 22 such that first axle shaft 22 is constrained to rotate with rotation of first side gear 40. First locking member 26 mounts to hub 114 of first side gear 40, with hole teeth 62 of first locking hole 60 engaging or meshing with external hub teeth 116. As such, first locking member 26 and first side gear 40 are constrained to rotate together, such that rotation of first locking member 26 causes rotation of first side gear 40, which in turn as noted causes rotation of first axle shaft 22.

First side spacers 50 are disposed between first side gear 40 and first locking member 26. One of first side spacers 50 contacts the back cam surface 124 of first side gear 40, with side spacers 50 used for positioning of first side gear 40 relative to first locking member 26. In the illustrated embodiment, first side spacers 50 are friction plates removed from the as supplied American Axle & Manufacturing, Inc. differential. It should be appreciated, however, that alternative spacers may be employed, for example spacers constructed without a friction surface, which is not required for differential carrier. Still further, an alternative first locking member may be made to have a greater thickness whereby the first locking member would directly contact back cam surface 124 such that spacers would not be required.

In like manner to first side gear 40, second side gear 42 includes a hub 126 having external hub teeth 128 and internal hub teeth 130. Internal hub teeth 130 of second side gear 42 are adapted to spline to shaft teeth 132 on end 43 of second axle shaft 24 such that second axle shaft 24 is constrained to rotate with rotation of second side gear 42. Second locking member 28 mounts to hub 114 of second side gear 42, with hole teeth 92 of second locking hole 90 engaging or meshing with external hub teeth 128. As such, second locking member 28 and second side gear 42 are constrained to rotate together, such that rotation of second locking member 128 causes rotation of second side gear 42, which in turn as noted causes rotation of second axle shaft 24.

First side gear 40 further includes driving teeth 136 and second side gear 42 includes driving teeth 138. Driving teeth 136, 138 interact with spider gears (not shown) in standard operation of the as manufactured differential, but are not used in differential carrier 20.

Figure 7:
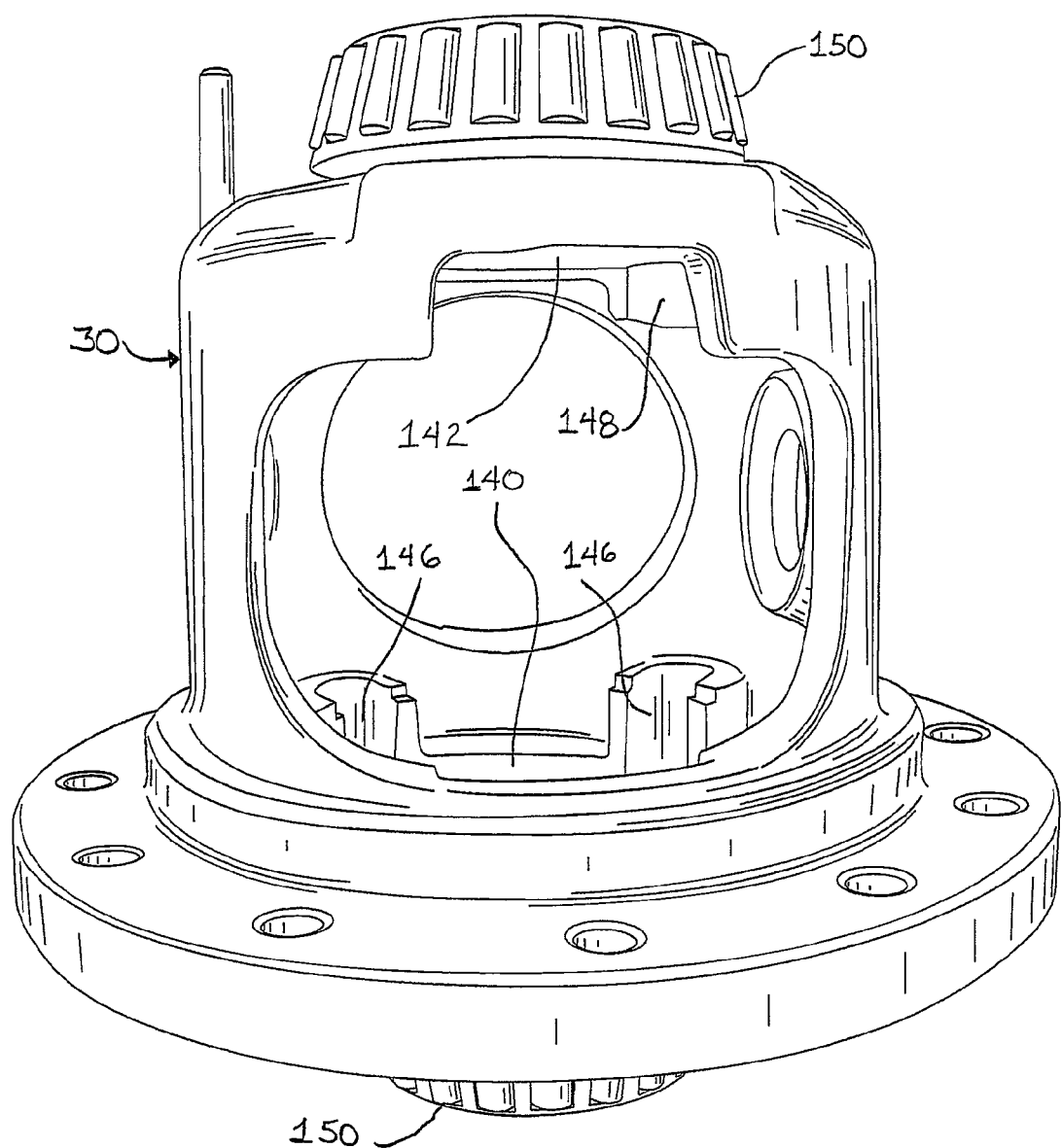
FIG. 7 is a perspective view of the housing of the differential carrier of FIG. 1.
Figure 8:
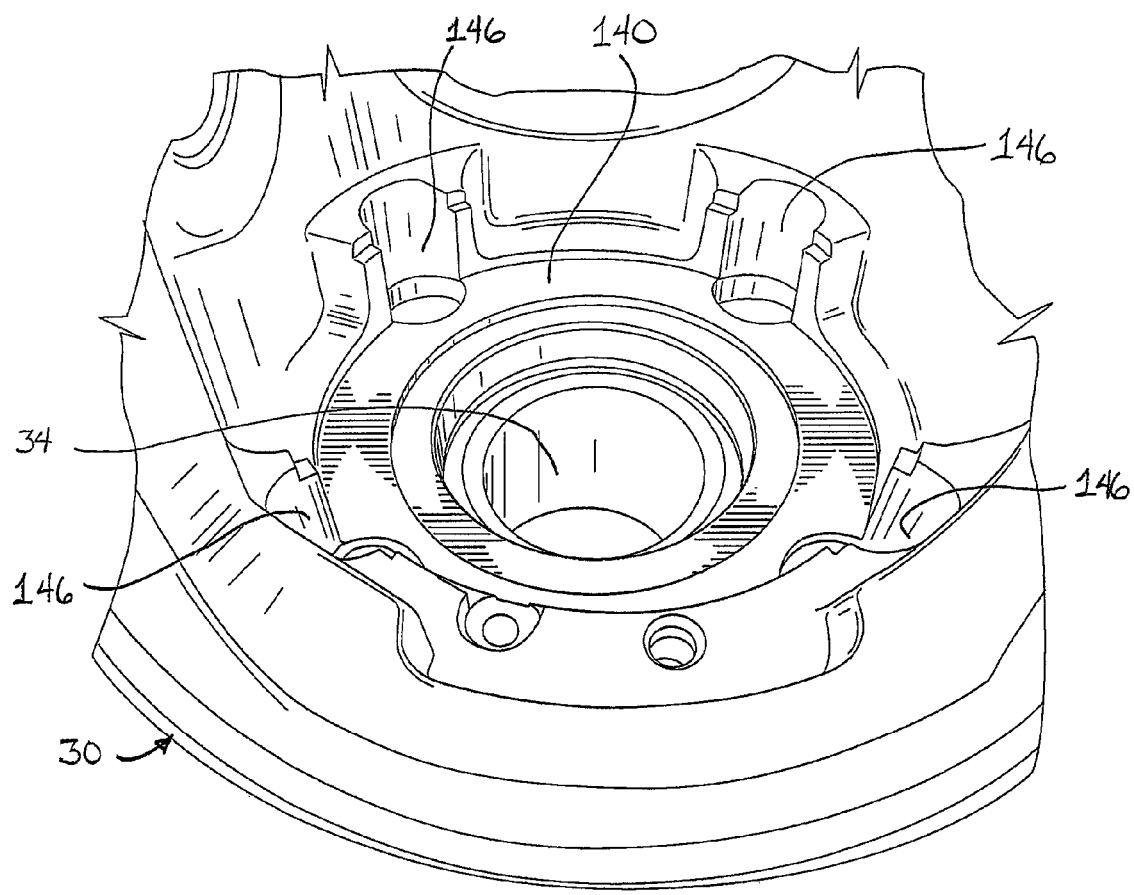
FIG. 8 is a perspective view of an internal first housing cavity of the housing of FIG. 7.
Figure 9:
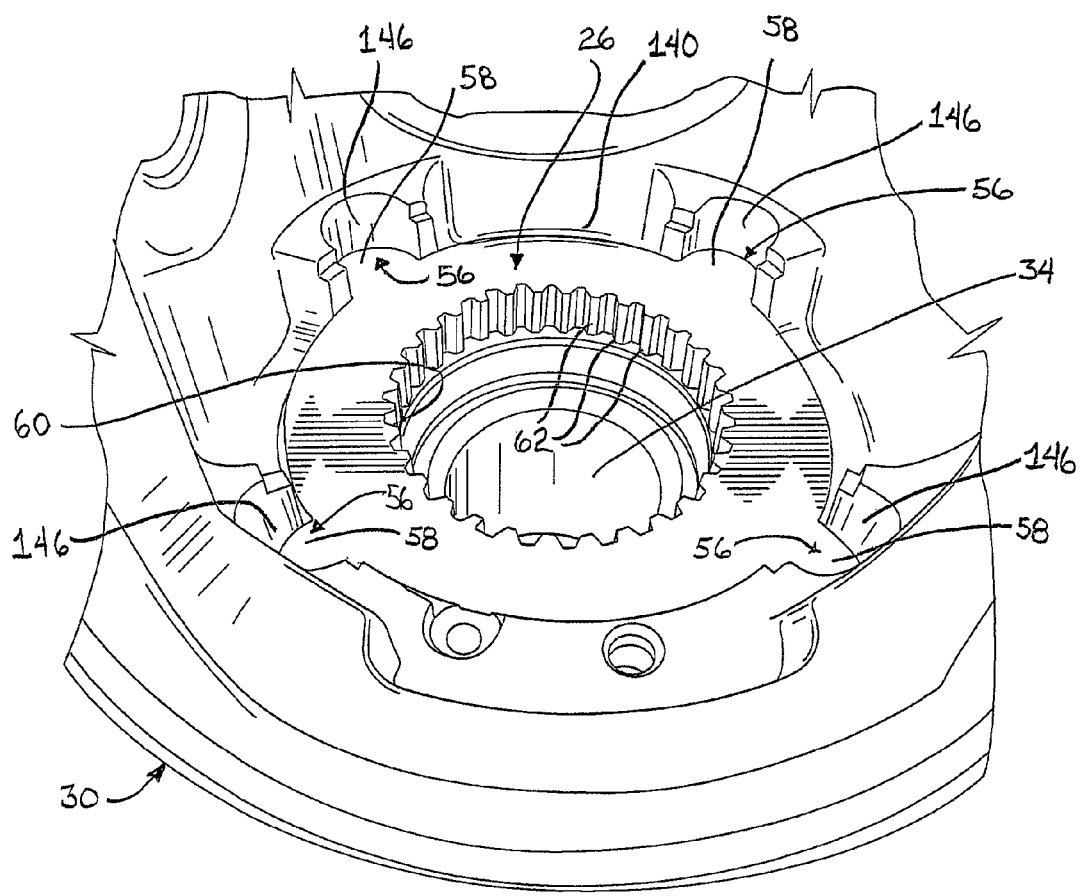
FIG. 9 is a perspective view of the first locking member installed in the first housing cavity of FIG. 8.
Figure 10:
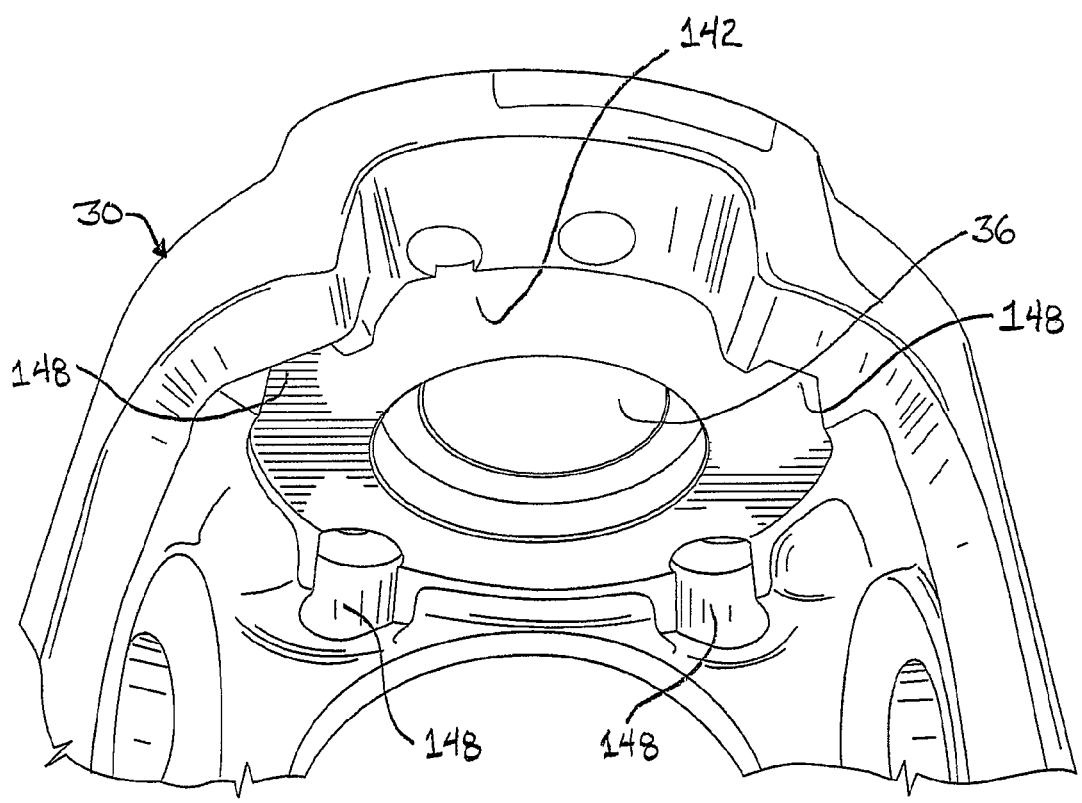
FIG. 10 is a perspective view of an internal second housing cavity of the housing of FIG. 7.

Referring now to FIGS. 7-11, the installation and arrangement of first and second locking members 26, 28 within housing 30 will now be discussed. Housing 30 includes both a first housing cavity 140 and a second housing cavity 142 located internally of the housing 30. First housing cavity 140 is associated with first axle shaft 22 and is located adjacent to and disposed about first shaft opening 34. First housing cavity 140 includes four cavity indents 146 (FIG. 8). Similarly, second housing cavity 142 is associated with second axle shaft 24 and is located adjacent to and disposed about second shaft opening 36. Second housing cavity 142 also includes four cavity indents 148 (FIG. 10).

Figure 11:
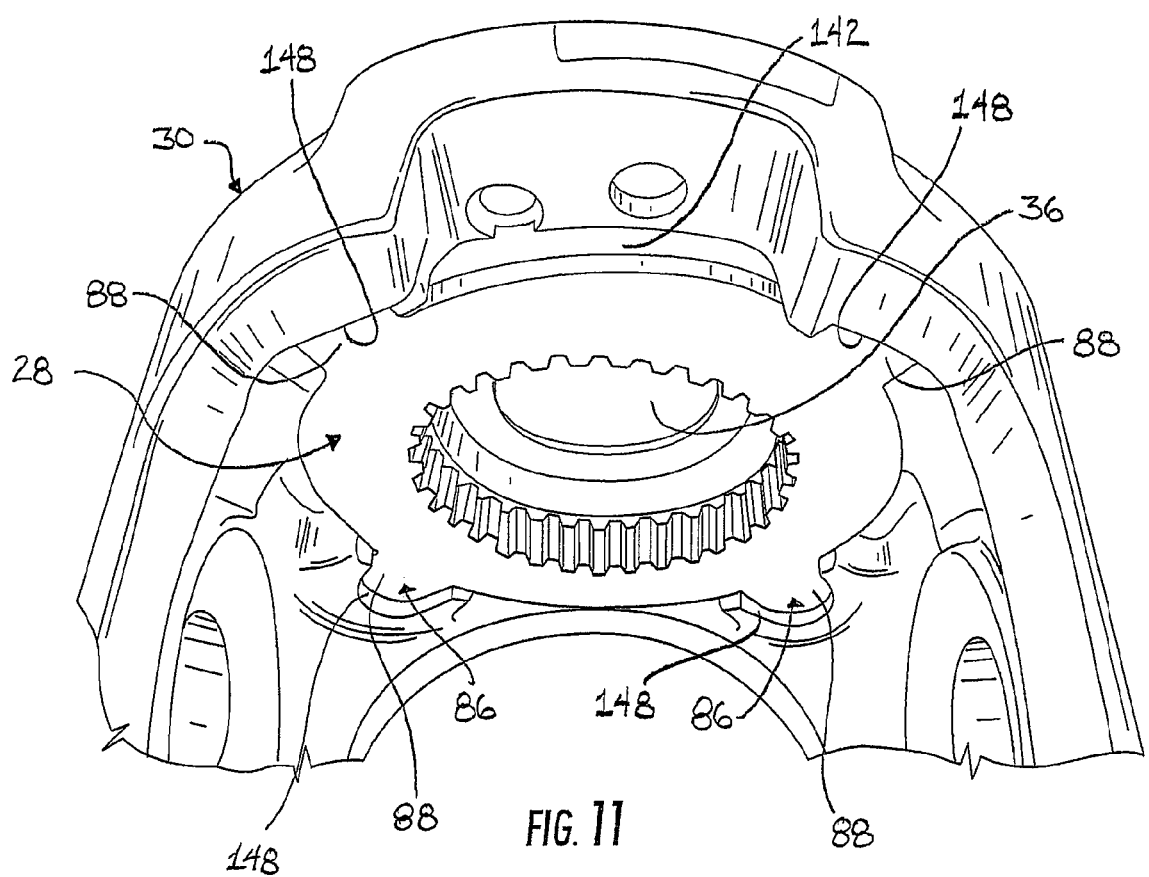
FIG. 11 is a perspective view of the second locking member installed in the second housing cavity of FIG. 10.

As shown in FIG. 9, first housing cavity 140 receives first locking member 26, with the four locking tabs 58 being received within the four cavity indents 146. Locking tabs 58 and cavity indents 146 operate to constrain first locking member 26 within first cavity 140 and to housing 30 such that rotation of housing 30 will cause rotation of first locking member 26. Similarly, as shown in FIG. 11, second housing cavity 142 receives second locking member 28, with the four locking tabs 88 being received within the four cavity indents 148. Locking tabs 88 and cavity indents 148 operate to constrain second locking member 28 within second cavity 142 and to housing 30 such that rotation of housing 30 will cause rotation of second locking member 28.

It should be appreciated that the mechanical linkage of first and second locking members 26, 28 to both housing 30 and to first and second axle shafts 22, 24, respectively, through first and second side gears 40, 42 results in permanent and continuous simultaneous driving of the drive wheels of a vehicle upon rotation of housing about axis 38.

Referring again to FIGS. 1-3, and as noted, shaft spacers 46, 48 are mounted to cross shaft 44, with gear spacer 52 disposed on cross shaft 42 between shaft spacers 46, 48. Cross shaft 44 is secured to housing 30 such that the position of the various shaft spacers 46, 48 and gear spacer 52 are maintained. FIGS. 2 and 7 also discloses the inclusion of a thrust bearing 150 mounted to housing, which are disposed about first and second shaft openings 34, 36, with the thrust bearings 150 being conventionally utilized.

The above description also encompasses the method for converting a differential into a permanently locked differential 20 employing first and second locking members 26, 28. Such method entailing removing the standard or conventional components enabling the axles 22, 24 to rotate at different rotational speeds and the components enabling the axles to be selectively locked. Although not shown, those conventional components may include a pair of spider gears, a rotating flywheel shaft having a flywheel mounted thereto, a pawl shaft having a pawl mounted thereto, with the pawl being selectively acted on by the flywheel, a cam plate, a movable disk set biased by a wave spring, and first and second disk packs comprising friction and guide disks associated with first and second vehicle axles, respectively. The method would then further involve installing the first and second locking members 26, 28 into the housing 30 and may include reinstalling components such as first and second side gears 40, 42. The method encompasses linking the first and second axle shafts 22, 24 to the differential housing 30 whereby the first and second axle shafts 22, 24 are constrained to rotate with rotation of the housing 30.

Alternative locking members may be employed and still enable the differential carrier to function as intended within the scope of the present invention. For example, one or both locking members may be constructed to directly secure to the respective axle shaft such that the first and/or second side gear may be removed. Still further, fewer than four locking tabs may be employed on a locking member. Additionally, locking members may be constructed to operate as described above, but be sized and shaped for use with other models of differentials or with differentials manufactured by companies other than American Axle & Manufacturing, Inc. For example, the locking protrusions may be formed to be square, rectangular, hooked, or T-shaped and may, by way of example, be employed with a differential manufactured by the Eaton Corporation. Still further, locking protrusions could be provided on housing with indents or cavities provided on the first and second locking members.

The differential carrier of the present invention by way of installation of permanent differential locking members causes both of the driving wheels to simultaneously and continuously rotate at an equivalent rate of rotation. The differential carrier thereby enables the vehicle to which it is used to be particularly useful for off-road applications, such as off-road recreational and emergency vehicles, and pulling applications, such as pulling competitions, as the oppositely disposed driving wheels affixed to the differential will both be simultaneously and continuously driven with approximately equivalent torque.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which I claim an exclusive property or privilege are defined as follows:

1. A differential carrier for a vehicle, said differential carrier causing oppositely disposed wheels mounted on first and second axle shafts to simultaneously and continuously rotate in response to rotation of said differential carrier, said differential carrier comprising:

a rotatable differential carrier housing, said housing having first and second shaft openings, said first shaft opening adapted to receive the first axle shaft and said second shaft opening adapted to receive the second axle shaft;

said housing further including a first housing cavity and a second housing cavity, said first housing cavity being disposed internally of said housing adjacent said first shaft opening and said second housing cavity being disposed internally of said housing adjacent said second shaft opening; and a first permanent differential locking member and a second permanent differential locking member;

said first locking member having a first locking hole with said first locking hole having first hole teeth immovably linking said first locking member with the first axle shaft, said first locking member including a first locking protrusion projecting from said first locking member, said first locking member being installed in said first housing cavity with said first locking protrusion mechanically engaging said housing such that said first locking member rotates simultaneously with rotation of said housing, whereby said first locking member causes the first axle shaft to rotate;

said second locking member having a second locking hole with said second locking hole having second hole teeth immovably linking said second locking member with the second axle shaft, said second locking member including a second locking protrusion projecting from said second locking member, said second locking member being installed in said second housing cavity with said second locking protrusion mechanically engaging said housing such that said second locking member rotates simultaneously with rotation of said housing, whereby said second locking member causes the second axle shaft to rotate.

2. The differential carrier of claim 1, wherein said first housing cavity includes a plurality of first cavity indents, and wherein said first locking protrusion comprises a plurality of radially projecting locking tabs, wherein said locking tabs are adapted to be received in said first cavity indents when said first locking member is installed in said first housing cavity such that said first locking member is substantially immovably retained in said first housing cavity.

3. The differential carrier of claim 2, wherein said first housing cavity includes four said first cavity indents, and wherein said first locking member includes four radially projecting locking tabs.

4. The differential carrier of claim 3, wherein said first locking member is generally ring shaped with an outer surface and defines an outside diameter of approximately 4.293 inches, and wherein said locking tabs of said first locking member project from said outer surface, with each said locking tab being spaced approximately 90 degrees from an adjacent said locking tab.

5. The differential carrier of claim 4, wherein each said locking tab has a width and a rounded end with each said locking tab projecting approximately 0.5 inches beyond said outside diameter, said width of said locking tabs being approximately 0.811 inches with said rounded ends having a radius of approximately 0.4055 inches.

6. The differential carrier of claim 3, wherein said first locking member is approximately 0.500 inches thick.

7. The differential carrier of claim 1, further including a first side gear, said first side gear including a hub having external hub teeth and internal hub teeth, said internal hub teeth being adapted to receive the first axle, and wherein said first hole teeth of said first locking member are adapted to mate with said external hub teeth.

8. The differential carrier of claim 7, wherein said first hole teeth are disposed about the entire circumference of said first locking hole, said first hole teeth defining a plurality of bottom lands, a plurality of top lands, and a plurality of teeth openings, and wherein said first locking hole has a bottom land diameter and a top land diameter.

9. The differential carrier of claim 8, wherein said bottom land diameter of said first locking hole is approximately 2.778 inches and said top land diameter of said first locking hole is approximately 2.585 inches, and wherein said bottom lands are approximately 0.075 inches wide and said teeth openings are approximately 0.175 inches.

10. The differential carrier of claim 1, wherein said second housing cavity includes a plurality of second cavity indents, and wherein said second locking protrusion comprises a plurality of radially projecting locking tabs, wherein said locking tabs are adapted to be received in said second cavity indents when said second locking member is installed in said second housing cavity such that said second locking member is substantially immovably retained in said second housing cavity.

11. The differential carrier of claim 10, wherein said second housing cavity includes four said second cavity indents, and wherein said second locking member includes four radially projecting locking tabs.

12. The differential carrier of claim 11, wherein said second locking member is generally ring shaped with an outer surface and defines an outside diameter of approximately 4.293 inches, and wherein said locking tabs of said second locking member project from said outer surface, with each said locking tab being spaced approximately 90 degrees from an adjacent said locking tab.

13. The differential carrier of claim 12, wherein each said locking tab has a width and a rounded end with each said locking tab projecting approximately 0.5 inches beyond said outside diameter, said width of said locking tabs being approximately 0.811 inches with said rounded ends having a radius of approximately 0.4055 inches.

14. The differential carrier of claim 13, wherein said second locking member is approximately 0.455 inches thick.

15. The differential carrier of claim 1, further including a second side gear, said second side gear including a hub having external hub teeth and internal hub teeth, said internal hub teeth being adapted to receive the second axle, and wherein said second hole teeth of said second locking member are adapted to mate with said external hub teeth.

16. The differential carrier of claim 15, wherein said second hole teeth are disposed about the entire circumference of said second locking hole, said second hole teeth defining a plurality of bottom lands and a plurality of teeth openings, and wherein said second locking hole has a bottom land diameter and a top land diameter.

17. The differential carrier of claim 16, wherein said bottom land diameter of said second locking hole is approximately 2.757 inches and said top land diameter of said second locking hole is approximately 2.564 inches, and wherein said bottom lands are approximately 0.055 inches wide and said teeth openings are approximately 0.147 inches.

18. A differential carrier for a vehicle, said differential carrier causing oppositely disposed wheels mounted on first and second axle shafts to simultaneously and continuously rotate in response to rotation of said differential carrier, said differential carrier comprising:
  a rotatable differential carrier housing, said housing having first and second shaft openings, said first shaft opening adapted to receive the first axle shaft and said second shaft opening adapted to receive the second axle shaft;
  said housing further including a first housing cavity and a second housing cavity, said first housing cavity being disposed internally of said housing adjacent said first shaft opening and including four first cavity indents, and said second housing cavity being disposed internally of said housing adjacent said second shaft opening and including four second cavity indents;
  a first side gear and a second side gear, said first side gear including a first hub having external first hub teeth and internal first hub teeth, said internal first hub teeth being adapted to receive the first axle, and said second side gear including a second hub having external second hub teeth and internal second hub teeth, said internal second hub teeth being adapted to receive the second axle; and
  a first permanent differential locking member and a second permanent differential locking member, said first locking member including four radially projecting first member locking tabs and said second locking member including four radially projecting second member locking tabs;
  said first locking member having a first locking hole with said first locking hole having first hole teeth adapted to engage said external first hub teeth, said first member locking tabs adapted to being received in said first cavity indents when said first locking member is installed in said first housing cavity such that said first locking member mechanically engages said housing and rotates simultaneously with rotation of said housing, whereby said first locking member causes the first axle shaft to rotate;
  said second locking member having a second locking hole with said second locking hole having second hole teeth adapted to, engage said external second hub teeth, said second member locking tabs adapted to being received in said second cavity indents when said second locking member is installed in said second housing cavity such that said second locking member mechanically engages said housing and rotates simultaneously with rotation of said housing, whereby said second locking member causes the second axle shaft to rotate.

19. The differential carrier of claim 18, wherein said first and second locking members are generally ring shaped and have outer surfaces and define outside diameters of approximately 4.293 inches, and wherein said first member locking tabs project from said outer surface of said first locking member, with each said first member locking tab being spaced approximately 90 degrees from an adjacent said first member locking tab, and wherein said second member locking tabs project from said outer surface of said second locking member, with each said second member locking tab being spaced approximately 90 degrees from an adjacent said second member locking tab.

20. The differential carrier of claim 18, wherein said first hole teeth of said first locking member are disposed about the entire circumference of said first locking hole, and wherein said second hole teeth of said second locking member are disposed about the entire circumference of said second locking hole.

* * * * *